United States Patent
Knox et al.

(10) Patent No.: US 7,170,412 B2
(45) Date of Patent: Jan. 30, 2007

(54) ANGLE OF POSITION OBJECT LOCATION SYSTEM AND METHOD

(75) Inventors: Michael Knox, Manhasset, NY (US); Raj Bridgelall, Morgan Hill, CA (US); Mark William Duron, East Patchogue, NY (US); Richard T. Knadle, Jr., Dix Hills, NY (US); James Joseph Bender, Centereach, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 168 days.

(21) Appl. No.: 10/931,476

(22) Filed: Aug. 31, 2004

(65) Prior Publication Data

US 2006/0044147 A1    Mar. 2, 2006

(51) Int. Cl.
*G08B 13/14* (2006.01)

(52) U.S. Cl. .............................. 340/572.1; 340/825.49; 342/42

(58) Field of Classification Search .............. 340/572.1, 340/825.49, 539.13, 572.7; 342/42, 44, 47, 342/127
See application file for complete search history.

(56) References Cited

U.S. PATENT DOCUMENTS 6,046,683 A * 4/2000 Pidwerbetsky et al. .... 340/10.4
6,356,230 B1 3/2002 Greef et al.
6,414,626 B1 7/2002 Greef et al.
6,509,836 B1 * 1/2003 Ingram ..................... 340/572.4
6,611,224 B1 * 8/2003 Nysen et al. ................. 342/42
6,989,750 B2 * 1/2006 Shanks et al. ........... 340/572.4
7,019,639 B2 * 3/2006 Stilp .......................... 340/531
2003/0058155 A1 3/2003 Landt
2003/0220711 A1 11/2003 Allen
2004/0160310 A1 8/2004 Mao-Song et al.

OTHER PUBLICATIONS

Partial International Search PCT/US2005/030580 Apr. 24, 2006.

* cited by examiner

*Primary Examiner*—John Tweel, Jr.
(74) *Attorney, Agent, or Firm*—Ingrassia Fisher & Lorenz, P.C.

(57) ABSTRACT

An object location system and method is provided for locating objects. The system includes an RFID reader, an angle calculator, and a distance calculator to determine which of a plurality of zones an object is located in or passing through. An RFID tag is affixed with the object that is to be located. The RFID reader transmits signals to the RFID tag and receives backscatter-modulated signals from the RFID tag at one or more RFID antennas. From those received signals, the angle calculator determines an angle of position of the RFID tag relative to the RFID antenna. From the angle of position the zone in which the object is located is determined.

32 Claims, 11 Drawing Sheets

| FUND FREQ (MHz) | RELATIVE PHASE UNWRAPPED (RADIANS) |
|---|---|
| 902 | 0.113234896 |
| 904 | 1.294354711 |
| 906 | 4.975474525 |
| 908 | 5.256659434 |
| 910 | 6.937714155 |
| 912 | 10.41883397 |
| 914 | 10.49995378 |
| 916 | 10.7810736 |
| 918 | 12.06219341 |
| 920 | 12.54331323 |
| 922 | 15.52443304 |
| 924 | 18.40555286 |
| 926 | 19.18667267 |
| 928 | 20.86779249 |

FIG. 10

| FUND FREQ (MHz) | RELATIVE PHASE MEASUREMENT (RADIANS) |
|---|---|
| 912 | 4.135648662 |
| 922 | 2.958062428 |
| 910 | 0.654528847 |
| 904 | 1.294354711 |
| 926 | 0.337711675 |
| 918 | 5.779008106 |
| 908 | 5.256659434 |
| 906 | 4.975474525 |
| 924 | 5.839182243 |
| 902 | 0.113234896 |
| 914 | 4.216768477 |
| 920 | 6.26012792 |
| 928 | 2.018236565 |
| 916 | 4.997888291 |

FIG. 9

ANGLE OF POSITION OBJECT LOCATION SYSTEM AND METHOD

FIELD OF THE INVENTION

This invention generally relates to object location systems, and more specifically relates to object location systems and radio frequency identification (RFID).

BACKGROUND OF THE INVENTION

In modem supply management systems there is a growing need for the ability to locate and track a wide variety of objects. This can include the locating and tracking of objects over wide areas, such as large factories and distribution centers.

Unfortunately, previous attempts creating such a system have failed to provide the accuracy and reliability desirable for such a system. For example, previous systems have relied upon exceedingly complex battery powered devices with high per-unit costs and limited battery life. The cost and accuracy limitations of these previous methods have prevented their adoption in applications that needed to provide the ability to track and locate large numbers of objects at a relatively low per-unit cost.

Accordingly, it is desirable to provide an improved method for locating objects. In addition, it is desirable to provide an improved system for locating objects. Furthermore, other desirable features and characteristics of the present invention will become apparent from the subsequent detailed description and the appended claims, taken in conjunction with the accompanying drawings and the foregoing technical field and background.

BRIEF SUMMARY OF THE INVENTION

The present invention provides an object location system and method for locating objects. The system includes an RFID reader, an angle calculator, and a distance calculator to determine which of a plurality of zones an object is located in or passing through. An RFID tag is affixed with the object that is to be located. The RFID reader transmits signals to the RFID tag and receives backscatter-modulated signals from the RFID tag at one or more RFID antennas. From those received signals, the angle calculator determines an angle of position of the RFID tag relative to the RFID antenna. From the angle of position the zone in which the object is located is determined. In one embodiment, a plurality of RFID antennas are distributed over an area. In this embodiment, each of the multiple RFID antennas receives a backscatter-modulated signal from the RFID tag and the angle of position relative to each RFID antenna is determined. The multiple angles of position at multiple locations are then used to triangulate the position of the object that includes the RFID tag. Thus, the system and method is able to determine a zone in which the object is located.

In another embodiment, the system and method further includes a distance calculator. Again, signals from the RFID tag are received by the RFID reader, and these signals are used to determine the distance to object. The distance measurement is then combined with angle of position measurement to again determine the zone in which the object is located.

In all of these cases, the system and method is able to determine which of a plurality of zones an object is located in. As one particular application, the system and method can be implemented to determine which of a plurality of portals an object is in, or passing through. In this application, each portal is a defined zone and the system and method can use angle of position and/or distance measurements to determine which portal the object has passed through. Such a system has application in inventory tracking where it is desirable to provide an accurate determination of where a product has been moved to. For example, such a system can be used to confirm that a particular shipment of products have been loaded onto a particular truck through a particular portal. Thus, the system and method can be used to provide efficient object location and tracking.

BRIEF DESCRIPTION OF DRAWINGS

The preferred exemplary embodiment of the present invention will hereinafter be described in conjunction with the appended drawings, where like designations denote like elements, and:

FIGS. 9 and 10 are table views of an exemplary data set in accordance with an exemplary embodiment of the present invention.

DETAILED DESCRIPTION OF THE INVENTION

Figure 1:
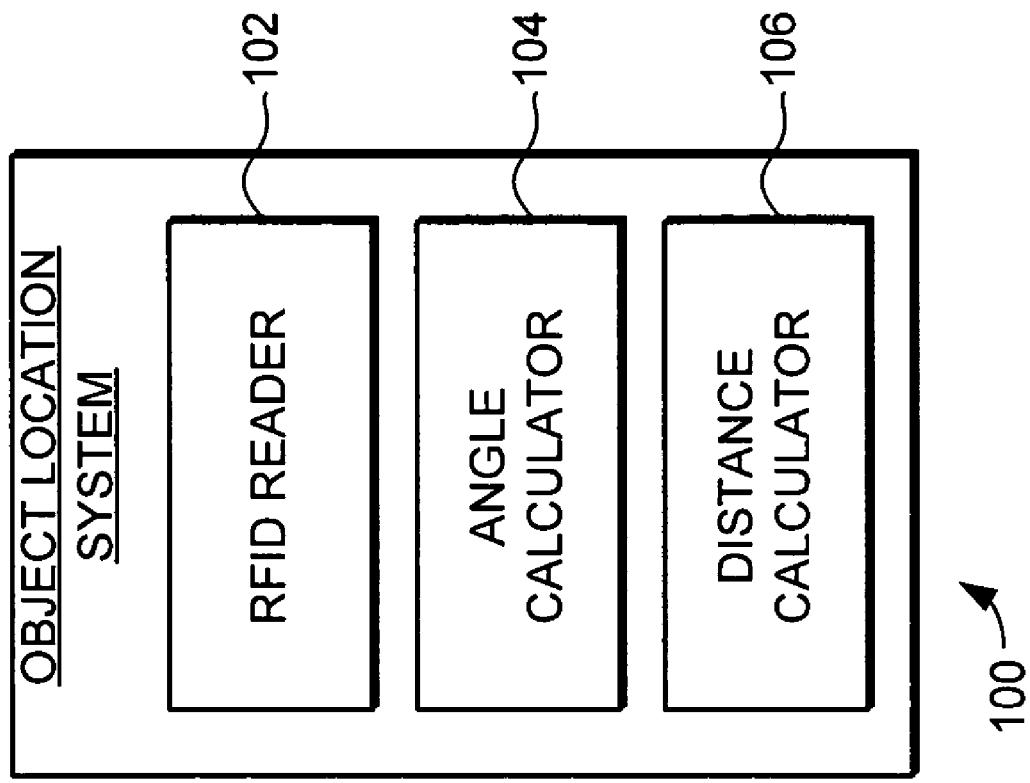
FIG. 1 is a schematic view of an object location system in accordance with an exemplary embodiment of the present invention.

The following detailed description is merely exemplary in nature and is not intended to limit the invention or the application and uses of the invention. Furthermore, there is no intention to be bound by any expressed or implied theory presented in the preceding technical field, background, brief summary or the following detailed description Generally, the present invention provides a system and method for locating objects that uses Radio Frequency Identification (RFID) tags for more accurate object location. RFID is a technology that incorporates the use of electromagnetic, electrostatic or magnetic coupling in the radio frequency spectrum to identify objects to which RFID tags are affixed. RFID systems in general provide the advantage of not requiring direct contact or line-of-sight scanning. A typical RFID system includes an RFID reader and a plurality of RFID tags that are affixed to the objects of interest. The RFID reader includes an antenna and also includes or is coupled to a transceiver. The RFID reader uses the antenna and transceiver to transmit and receive radio frequency signals to and from the RFID tag. The RFID reader has the ability to select one or more tags by transmitting an identifier that specifies one or more of the tags from a plurality of tags. When an RFID reader selects an RFID tag, the RFID tag is put into a responsive mode, with other tags going into a muted state.

When put into responsive mode, the tag transmits data back to the reader by modulating a backscattered signal that is received at the RFID reader antenna. As one example, some tags use variable impedance coupled to the antenna that can be used to change the amount of energy that is reflected back by the tag. These tags can transmit data to the reader by selectively varying the impedance to modulate the backscattered signals. Similarly, these tags can be put into a "muted" or non-responsive state by selecting and maintaining an impedance value.

Thus, an RFID reader can be used to select one or more RFID tags and retrieve data from the selected tags. As such, RFID tags can be used to identify and track large numbers of objects. Furthermore, because RFID tags have a relatively low per-unit cost, they have the ability to track large numbers of objects at relatively low costs.

RFID tags are used in a variety of commercial contexts that require a unique identification system for large numbers of items. As examples, RFID tags are used in everything from department store inventory and checkout systems to the tracking of military supplies. RFID systems are often preferred for object identification due to their increased range, lack of a line of sight requirement between a tag and its reader, and high multi-tag throughput.

RFID tags are available in a variety of configurations, shapes and sizes. For example, different tags for different applications typically have a shape and size appropriate for its application. RFID tags are commonly categorized as active, passive or semi-passive. Active RFID tags include an internal battery used to power the tag and transmit data and typically include the ability to read and write greater amounts of stored data than either passive or semi-passive tags. Passive RFID tags transmit by reflecting and absorbing energy from the RF transmissions from the reader, and use absorbed energy from the reader for data storage, retrieval, and manipulation. Semi-passive tags include an internal battery that is used for data storage, retrieval, and manipulation, and transmit data by reflecting and absorbing energy from the reader.

Passive and semi-passive tags are typically lighter and less expensive than active tags. Passive tags offer a virtually unlimited operational lifetime because they do not require a battery for operation. The trade off is that they typically have a shorter read range than active tags, and require a higher output power from the reader. It is important to note that governmental restrictions in many jurisdictions restrict reader output power to ensure safety and to minimize interference between devices that must share frequency bands.

Passive and semi-passive tags include both read-only tags that are programmable once with a unique set of data that cannot be later modified, and read/writeable tags that can be rewritten one or more times using a suitable RFID writing device. Another type of RFID tag are multi-mode tags. Multi-mode tags can operate using more than one mode. For example, some multi-mode tags can operate as both passive or semi-passive tags depending on individual needs. Other multi-mode tags can operate as passive, semi-passive or active tags. Furthermore, some multi-mode tags can communicate using a variety of protocols, 802.11x (where 802.11x is defined to include any of the various 802.11 protocols) or Bluetooth specifications.

RFID systems can use a variety of techniques to transmit data to and from the tag. For transmission to the tag, the data can be transmitted using any of a variety of modulation techniques, including amplitude modulation (AM), phase modulation (PM), and frequency modulation (FM). Furthermore, the data transmitted to the tag can be encoded using any of a variety of techniques, including frequency shift keying (FSK), pulse position modulation (PPM), pulse duration modulation (PDM), and amplitude shift keying (ASK).

As discussed above, passive and semi-passive tags transmit by selectively reflecting and absorbing energy from the reader, in a process generally referred to as backscatter modulation. Again, in backscatter modulation, the data can be encoded using a variety of techniques. For example, the data can be encoded using FSK, where the tag absorb-reflects at one rate to represent a first state (e.g., "one") and at another rate to represent a second state (e.g., "zero"). As another example, the data can be encoded using ASK, where the tag absorb-reflects at one rate for some duration to represent a first state (e.g., "one") and ceases backscatter modulation for another duration to represent a second state (e.g., "zero"). RFID systems also typically use a variety of different frequency ranges, including 30 KHz–500 KHz, 850 MHz–950 MHz and 2.4 GHz–2.5 GHz, depending on the regulatory spectrum allocations and performance requirements matched to various application requirements. For example, lower frequency systems typically provide better electromagnetic penetration through water while higher frequency systems do not. Lower frequency passive systems commonly operate within a few inches with small reader antennas while higher frequency systems commonly operate within several feet with similarly sized antennas. Also, lower frequency regulatory allocations are generally more widespread worldwide and typically allow more output power for passive tags than do higher frequency systems. However, where higher frequency spectrum is available for RFID, such as within FCC regulated domains, the output power is substantial and allows for robust long-range performance.

The present invention provides an object location system and method for locating objects. Turning now to FIG. 1, an object location system 100 is illustrated schematically. The system 100 includes an RFID reader 102, an angle calculator 104, and a distance calculator 106 to determine which of a plurality of zones an object is located in or passing through. An RFID tag is affixed with the object that is to be located. The RFID reader 102 addresses and transmits signals to the RFID tag and receives backscatter-modulated signals from the RFID tag at one or more RFID antennas. From those received signals, the angle calculator 104 determines an angle of position of the RFID tag relative to the RFID antenna. From the angle of position the zone in which the object is located is determined. In one embodiment, a plurality of RFID antennas are distributed over an area. In this embodiment, each of the multiple RFID antennas receives a backscatter-modulated signal from the RFID tag and the angle of position relative to each RFID antenna is determined. The multiple angles of position at multiple locations are then used to triangulate the position of the object that includes the RFID tag. Thus, the system 100 is able to determine the zone in which the object is located.

In some embodiments, the system 100 includes a distance calculator 106. Again, signals from the RFID tag are received by the RFID reader 102, and these signals are used to determine the distance to the object. The distance measurement is then combined with an angle of position measurement to again determine the zone in which the object is located.

In all of these embodiments, system 100 is able to determine which of a plurality of zones an object is located in. As one particular application, the system 100 can be implemented to determine which of a plurality of portals an object is in, or passing through. In this application, each portal is a defined zone and the system 100 uses angle of position and/or distance measurements to determine which portal the object has passed through. Such a system 100 has application in inventory tracking where it is desirable to provide an accurate determination of where a product has been moved to. For example, such a system can be used to confirm that a particular shipment of products have been loaded onto a particular truck through a particular portal. Thus, the system 100 can be used to provide efficient object location and tracking.

It should be noted that the system 100 can be implemented in variety of ways. For example, the angle calculator 104 and distance calculator 106 can be fully implemented as part of each RFID reader. In another implementation, the angle calculator 104 and distance calculator 106 can be implemented at a central location, with the phase and other data used to calculate the angle and distance transmitted to the central computer using any suitable networking technology. Finally, the angle calculator 104 and distance calculator 106 can be implemented partially in the reader, and partially at a central location.

Figure 2:
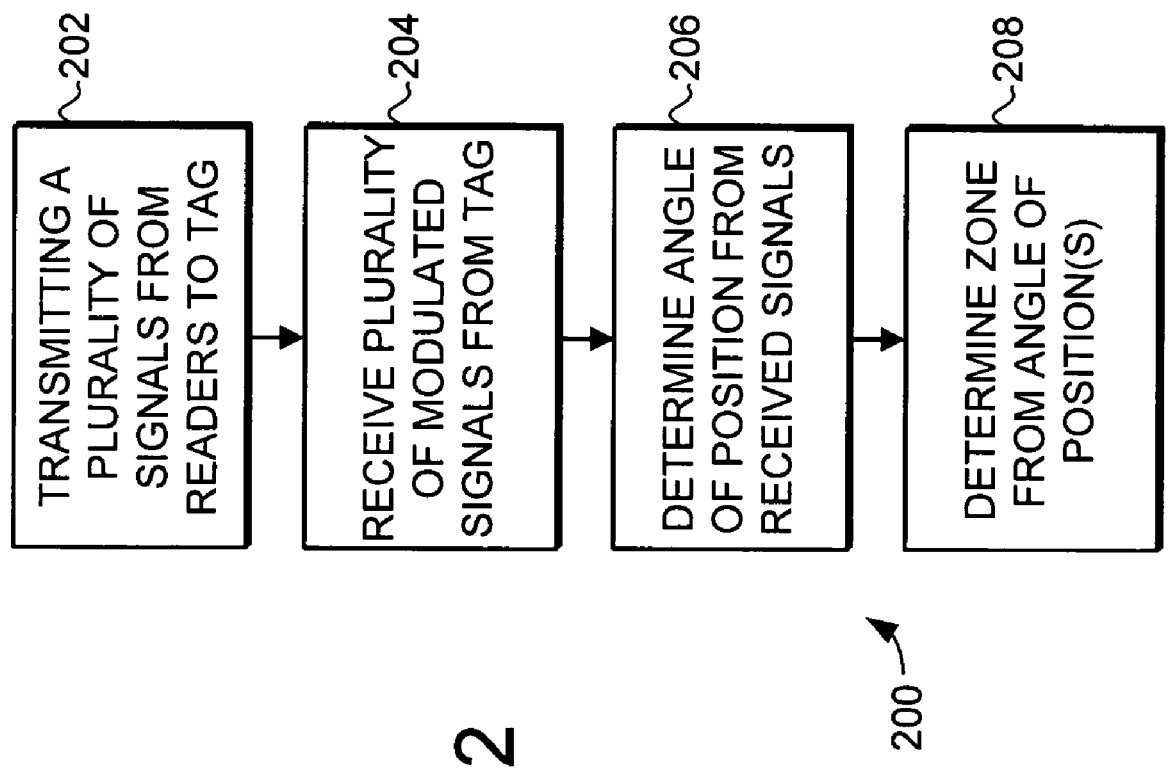
FIG. 2 is a flow diagram of a method for locating an object in accordance with an exemplary embodiment of the present invention.

Turning now to FIG. 2, a method 200 for determining the location of an object is illustrated. In the method 200, RFID tags are affixed to the objects that are being tracked. The first step 202 in method 200 is to transmit a plurality of signals from RFID reader(s) to the tag. This will typically include addressing the RFID tag. When an RFID tag is addressed, it is put into a responsive mode where it will modulate and backscatter the received signals from the reader. Other tags within range of the reader that are not addressed will typically go into a muted state, where their reflections are intentionally minimized. Thus, the RFID readers are able to select one out of many different tags and receive backscatter-modulated signals only from the selected RFID tag.

The transmitted signals from the RFID reader are received by the RFID tag. In response to these signals, the selected RFID tag backscatter modulates the plurality of transmitted signals to create a plurality of backscatter-modulated signals. In the next step 204, the RFID reader receives the backscatter-modulated signals at one or more antennas and demodulates the plurality of backscatter-modulated signals.

The next step 206 is to determine the angle of position of the RFID tag from the received signals. As will be described in greater detail below, the angle of position can be determined by receiving and processing the modulated signals from the RFID tag at an antenna pair. The received modulated signals at each antenna are added and subtracted to create a sum and delta output. By tracking the sum and delta outputs resulting from several backscatter-modulated signals from the same RFID tag, the angle of position of the RFID tag and its associated object can be determined. Specifically, by tracking the sum and delta signals resulting from multiple backscatter-modulated signals as the object moves and determining the resulting rotation direction in sum/delta space, the angle of position of the RFID tag relative to the antenna pair can be roughly determined.

The next step 208 is to determine the zone in which object resides from the angle of positions. This can be done in several ways. As one example, the angle of position can be determined relative to several different RFID antenna pairs. The multiple angles of position relative to multiple RFID reader antenna pairs can then be used to triangulate the approximate position of the object that includes the RFID tag. In another method, the angle of position is combined with a distance measurement to determine the zone in which the object resides. One technique for determining the distance measurement is to use a phase difference of arrival process that will be described in greater detail below.

Figure 3:
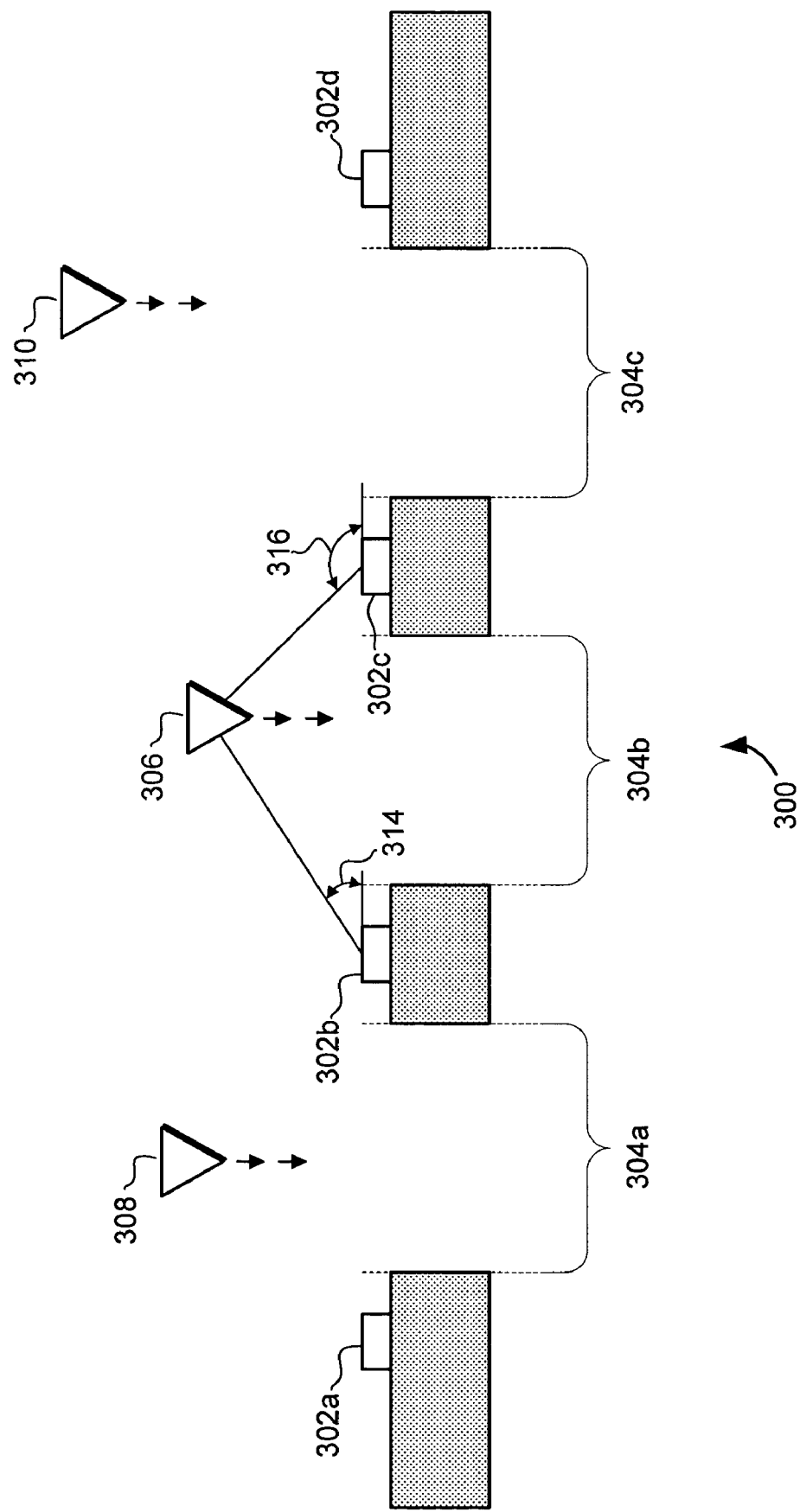
FIGS. 3 and 4 are schematic views of an area with a object location system in accordance with an exemplary embodiment of the present invention.

Turning now to FIG. 3, an exemplary portal area 300 is illustrated. The portal area 300 is exemplary of the type of area in which the system and method can be adapted to determine the location of objects. The area 300 includes three portals, 304a, 304b and 304c, through which objects are transported. The object location system and method can be used to determine which of the portals 304 an object is moving through. Such a system has many different applications. For example, it has application in inventory systems where it is desirable to verify that a specific object is or has been delivered through a specific portal. Thus, the system can be used to track inventory passing through the portals 304 to ensure that specific inventory reaches its intended destination.

In such a system, RFID tags are attached to the objects and used to determine the location of the object in general, and which portal an object is passing through in specific. In the illustrated example, three objects 306, 308 and 310 are illustrated. Each object would include one or more RFID tags that are used for object tracking. It should be noted that each object 306, 308 and 310 can comprise an individual item, or can include groups of items bundled and/or packaged together.

To determine object location, the system includes an RFID reader with a plurality of antennas 302a, 302b, 302c and 302d. The antennas 302 are positioned between and at the edges of the portals, where they can be used to determine which portal an object is moving through. Each antenna 302 can include one or more antennas, and each antenna 302 would preferably include an antenna pair. As an object is moving through the area 300, the RFID reader will transmit a plurality of signals to the associated RFID tag on the object. In response, the RFID tag will create a plurality backscatter-modulated signals. The backscater modulated signals are received at one or more of the RFID antennas 302, where they are used to determine which portal the object is moving through.

In the illustrated example, the RFID tag on object 306 creates backscatter-modulated signals that are received at RFID antennas 302b and 302c. From the received backscatter-modulated signals, the angle of position of the object 306 is determined, and from this it can be determined that the object 306 is passing through portal 304b. Specifically, by determining the angle 314 relative antenna 302b and object 306, and also determining the angle 316 relative antenna 302c and object 306, it can be determined that the object 306 is between antennas 302c and 302b. From this it can be reasonably inferred that the object 306 is passing through portal 304b.

Figure 4:
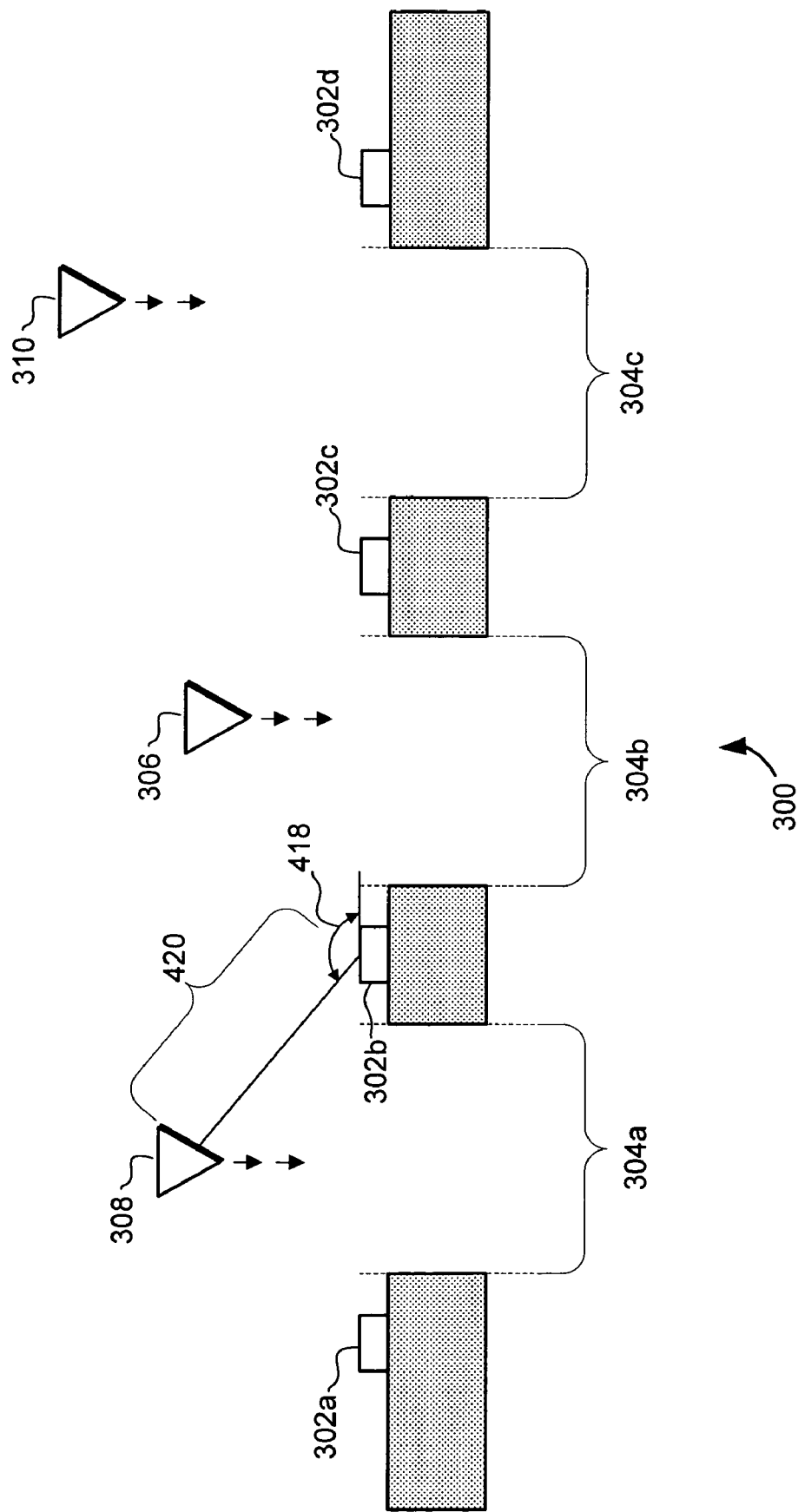

In some cases, it may be desirable to combine angle of position measurements with distance measurements to determine object location. For example, in some cases the backscatter-modulated signals from the RFID tag will only be received at one RFID antenna. In such a situation, the distance measurement can be combined with the one angle of position measurement to determine object location. Turning now to FIG. 4, the portal area 300 is again illustrated. In FIG. 4, object 308 is moving through the portal area 300.

Again, to determine which portal the object 308 is passing through the RFID reader will transmit a plurality of signals to the associated RFID tag. In response, the RFID tag creates a plurality of backscatter-modulated signals. The backscatter modulated signals are received at one or more RFID antennas 302, where they are used to determine which portal the object is moving through.

In the example illustrated in FIG. 4, the RFID tag on object 308 creates backscatter-modulated signals that are received at RFID antenna 302b. From the received backscatter-modulated signals, the angle of position and distance to the object 308 is determined, and from this it can be determined that the object 308 is passing through portal 304a. Specifically, by determining the angle 418 relative antenna 302b and object 308, and also determining the distance between antenna 302b and object 308, it can be determined that the object 308 is between antennas 302a and 302b. From this it can be reasonably inferred that the object 308 is passing through portal 304a.

Thus, the system and method is able to use backscatter-modulated signals from RFID tags on objects to determine the angle of position and/or distance to the RFID tag, and from that determine which portal the object is passing through.

Figure 5:
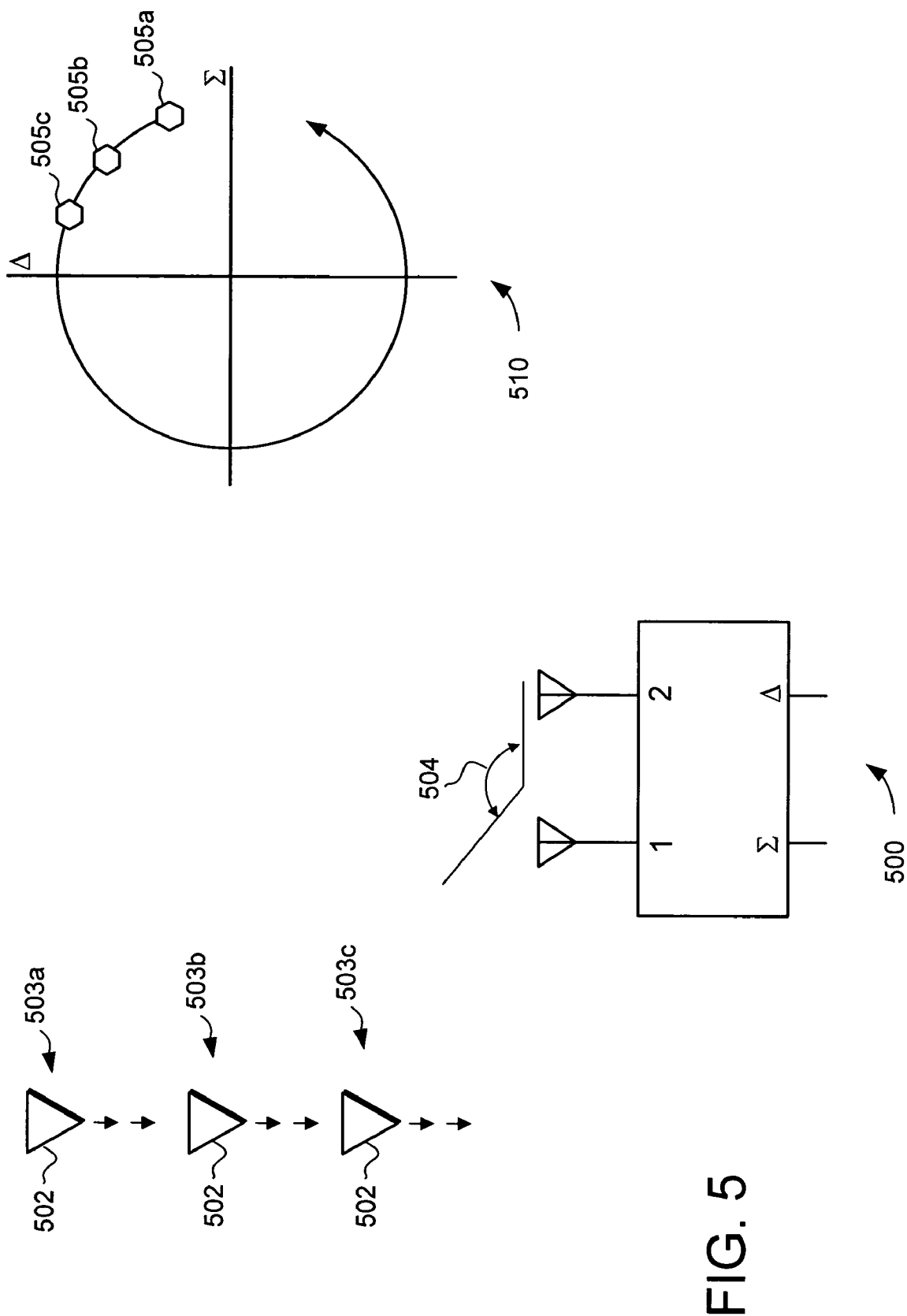
FIGS. 5 and 6 are schematic views of an antenna pair and sum-delta plots in accordance with an exemplary embodiment of the present invention.

Turning now to FIG. 5, an exemplary pair of RFID antennas 500 is illustrated along with a moving object 502 and resulting sum-delta plot 510. The RFID antenna pair 500 is exemplary of the type of antennas that can be used in the system and method for object location. For example, the antenna pair 500 can be used for each antenna 302 as illustrated in FIGS. 3 and 4. In the example illustrated in FIG. 5, the antenna pair 500 includes two antennas (labeled 1 and 2), a summation output ($\Sigma$) and a delta output ($\Delta$). The sum output $\Sigma$ produces a vector sum of the signals received at the antennas. The delta output $\Delta$ produces a vector difference of the signals received at the antennas. The sum output $\Sigma$ and delta output $\Delta$ will be used to determine the angle of position. Specifically, by determining the change in the sum and delta outputs that result from the movement of the object, the angle of position of the object can be determined. That is, an object moving on one side of the centerline of the antenna pair will result in clockwise change in the sum and delta output space, while an object moving on the other side of the centerline will result in a counter-clockwise change in the sum and delta output space.

The antennas in the antenna pair 500 are preferably spaced at a spacing of ½ wavelength of the carrier frequency. This spacing is optimal based on antenna array theory which shows that the effective capture area of a single antenna element has a radius of approximately ¼ wavelength. Thus, placing two antenna elements next to each other results in the optimal capture area for the antenna pair for the ½ wavelength spacing. If the spacing is less than ½ wavelength the effective capture area is reduced from optimum. If the antenna spacing is larger that ½ wavelength, the antennas create an interferometer and multiple lobes, sometimes called grating lobes, will be created in the antenna pattern resulting in a possible ambiguity in the received signals.

The illustrated antenna pair 500 can be implemented with a 180-degree hybrid. In general, a 180 degree hybrid is a four-port device with a 180 degree phase shift between two output ports. If a signal is applied to port 1, this signal will be evenly split and in-phase between ports 2 and 3 with port 4 being isolated. If the signal is applied to port 4, the signal is divided between ports 2 and 3 with a 180 degree phase shift and port 1 is isolated. When operated as a combiner with signals applied at ports 2 and 3, the sum of the inputs will be observed at port 1 and the difference will be observed at port 4. Hence ports 1 and 4 are referred as the sum and delta ports. In this application the 180-degree hybrid receives the two backscatter-modulated signals in the form of vectors each having a unique magnitude and phase angle. The 180-degree hybrid performs a vector addition and subtraction of the two received signals, resulting in the sum output $\Sigma$ and delta output $\Delta$.

When an RFID tag is positioned at 90 degrees angle of position from the antenna pair, a maximum signal is observed the sum output $\Sigma$ and a minimum signal is observed at the delta output $\Delta$. At other angles of incidences, different signal amplitudes are observed at the sum and delta outputs. Furthermore, the angle of the sum-delta pattern is 180 degrees out of phase for angles of position greater than 90 when compared to the sum-delta pattern for angles of position less than 90 degrees. By examining the sum and delta outputs from several signals, the position of the RFID tag with respect to the centerline can be determined.

In the illustrated example, the object 502 is shown at three different locations (503a, 503b, 503c) along a first path of movement on a first side of antenna pair 500. At each location 503 the RFID tag on the object 502 is interrogated by transmitting the appropriate signal to the RFID tag. In response, the RFID tag creates a backscatter-modulated signal that is received at the antenna pair 500. Specifically, the backscatter-modulated signal is received at both antennas 1 and 2 in the antenna pair. Because each antenna is at a slightly different distance from the RFID, the received backscatter-modulated signals will have different phases when received at the two antennas. The difference in phase manifests itself in the resulting sum output $\Sigma$ and delta output $\Delta$. To determine the angle of position of the object 502, sum output $\Sigma$ and delta output $\Delta$ corresponding to multiple different locations 503 are recorded. In the illustrated example, outputs 505a, 505b and 505c in sum-delta plot 510 correspond to the three different locations 503a, 503b and 503c. Thus, as the object 502 moves along the path defined by locations 503, the outputs 505 in the sum-delta space move in a counter-clockwise direction in the sum-delta space. This corresponds to an angle of position 504 of the object 502 relative to the antenna pair 500 being greater than 90 degrees. It should be noted that the relationships between object 502 movement and changes in the sum-delta plot 510 are not illustrated in scale, and that the amount of change in the sum-delta plot 510 as a function of object movement would depend upon numerous factors, including the frequency used and the and the relative position between the object 502 and the antenna pair 500.

Figure 6:
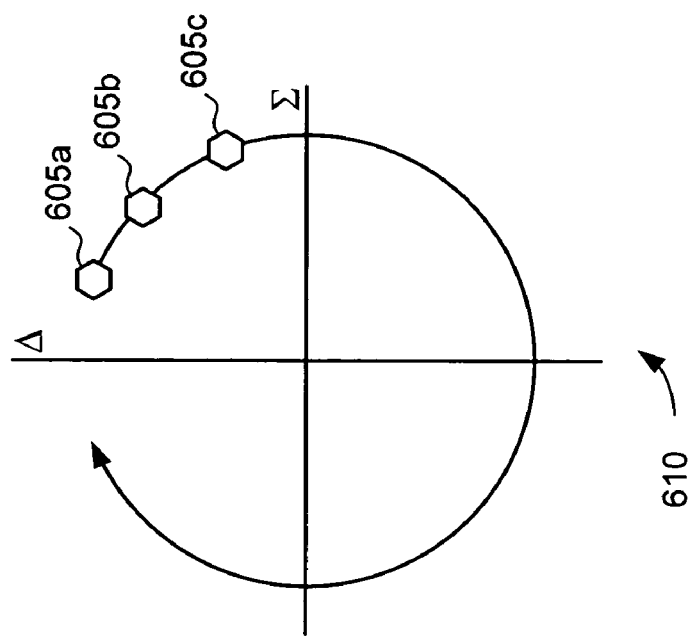
Figure 6:
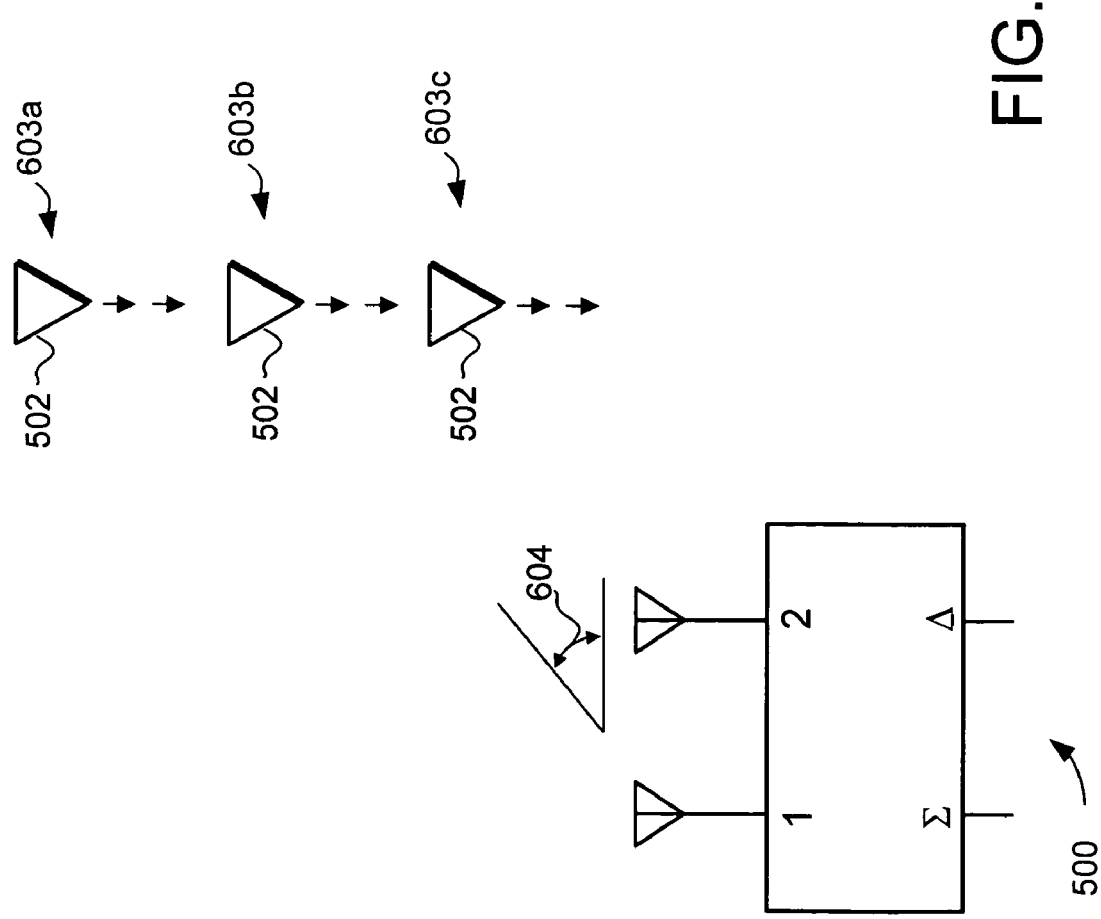

Turning now to FIG. 6, the exemplary pair of RFID antennas 500 is illustrated along with the moving object 502 and resulting sum-delta plot 610. In this example, the object 502 is shown at three different locations (603a, 603b, 603c) along a second path of movement on an opposite, second side of antenna pair 500. Again, at each location 603 the RFID tag on the object 502 is interrogated by transmitting the appropriate signal to the RFID tag. In response, the RFID tag creates a backscatter-modulated signal that received at the antenna pair 500. Again, because each antenna is at a slightly different distance from the RFID tag, the received backscatter-modulated signals will have different phases when received at the two antennas. The difference in phase manifests itself in the resulting sum output $\Sigma$ and delta output $\Delta$. To determine the angle of position of the object 502, sum output $\Sigma$ and delta output $\Delta$ corresponding to multiple different locations 603 we again recorded. In the example of FIG. 6, outputs 605a, 605b and 605c in sum-delta plot 610 correspond to the three different locations 603a, 603b and 603c. Thus, as the object 502 moves along the path defined by locations 603, the outputs 605 in the sum-delta space move in a clockwise direction. This corresponds to an angle of position 604 of the object 502 relative to the antenna pair 500 being less than 90 degrees.

The illustrated antenna pair 500 can be implemented with a 180-degree hybrid. In general, a 180 degree hybrid is a four-port device with a 180 degree phase shift between two output ports. If a signal is applied to port 1, this signal will be evenly split and in-phase between ports 2 and 3 with port 4 being isolated. If the signal is applied to port 4, the signal is divided between ports 2 and 3 with a 180 degree phase shift and port 1 is isolated. When operated as a combiner with signals applied at ports 2 and 3, the sum of the inputs will be observed at port 1 and the difference will be observed at port 4. Hence ports 1 and 4 are referred as the sum and delta ports. In this application the 180-degree hybrid receives the two backscatter-modulated signals in the form of vectors each having a unique magnitude and phase angle. The 180-degree hybrid performs a vector addition and subtraction of the two received signals, resulting in the sum output $\Sigma$ and delta output $\Delta$.

It should be noted that the directions illustrated in the FIGS. 5 and 6 are merely exemplary and would depend on the particular implementations. Thus, in some applications a clockwise rotation in the sum-delta space would correspond to a greater than 90 degree angle of position and vice versa. For example, if the x-axis was referenced as the sum and the y-axis was the delta, there would exist once sense of rotation as opposed to the case when the axis definition was switched. It should also be noted that to fully disambiguate the sum-delta rotation direction it is desirable to have a relatively high rate of RFID tag interrogation. Specifically, it is desirable to interrogate the RFID tag often enough that the sum-delta rotation between each consecutive interrogation is less than 180 degrees. Otherwise, it can be difficult to determine what the actual direction of rotation is. The interrogation rate selected would depend upon several factors, including the frequency used, the spacing of the antennas, and the expected velocity of objects that are to be located. For example, in an application where the carrier wavelength was 12 inches and an object was the sum-delta phase would have a full 360 degrees of rotation for every 6 inches of object movement. If such an object could be expected to move at a rate of 1 ft/sec it would be desirable to sample the backscatter at a rate of at least 4 samples per second in order to prevent phase ambiguity in the direction of rotation (clockwise or counter-clockwise) in the sum-delta measurement.

Figure 7:
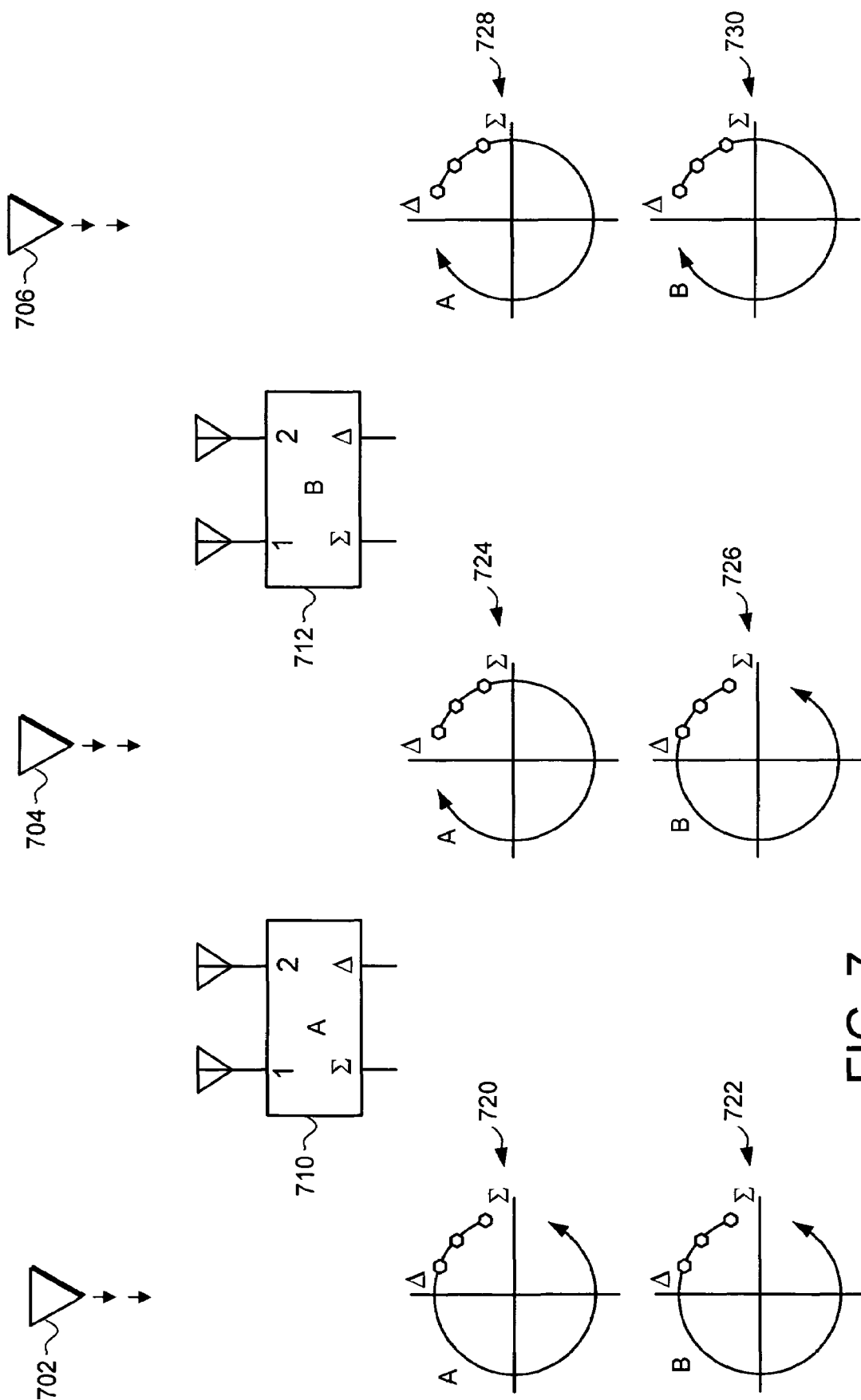
FIG. 7 is a schematic view of two antenna pairs and sum-delta plots is accordance with an exemplary embodiment of the present invention.

Turning now to FIG. 7, an exemplary object location system with two antenna pairs is illustrated, along with the resulting sum-delta plots from three exemplary moving objects. Specifically, the object location system includes a first antenna pair 710 (labeled A) and a second antenna pair 712 (labeled B). Three exemplary objects 702, 704 and 706 are shown moving along three different paths. Object 702 is on the far left, to the left of both antenna pairs. Object 704 is in the middle, between the two antenna pairs. Finally, object 706 is on the far right, to the right of both antenna pairs. Also illustrated in FIG. 7 are six sum-delta plots representing exemplary outputs of antenna pairs 710 and 712 during movement of the objects 702, 704 and 706.

Specifically, sum-delta plot 720 illustrates an exemplary sum-delta output from antenna pair 710 that results from interrogating an RFID tag on object 702 as it moves in the indicated direction. Likewise, sum-delta plot 722 illustrates an exemplary sum-delta output from antenna pair 712 that results from the same interrogation of object 702. Because object 702 is moving on the left side of both antenna pairs, i.e., the angle of position in greater than 90 degrees, both sum-delta plots exhibit counter-clockwise rotation.

Sum-delta plot 724 illustrates an exemplary sum-delta output from antenna pair 710 that results from interrogating an RFID tag on object 704 as it moves in the indicated direction. Likewise, sum-delta plot 726 illustrates an exemplary sum-delta output from antenna pair 712 that results from the same interrogation of object 704. Because object 704 is moving on the right side of antenna pair 710, i.e., the angle of position is less than 90 degrees, sub-delta plot 724 exhibits a clockwise rotation. Conversely, because object 704 is moving on the left side of antenna pair 712, i.e., the angle of position is greater than 90 degrees, sub-delta plot 726 exhibits a counter-clockwise rotation.

Sum-delta plot 728 illustrates an exemplary sum-delta output from antenna pair 710 that results from interrogating an RFID tag on object 706 as it moves in the indicated direction. Likewise, sum-delta plot 730 illustrates an exemplary sum-delta output from antenna pair 712 that results from the same interrogation of object 706. Because object 706 is moving on the right side of both antenna pairs, i.e., the angle of position is less than 90 degrees, both sum-delta plots exhibit clockwise rotation.

FIG. 7 thus illustrates how multiple RFID interrogations from multiple antenna pairs can be used to determine object location. Specifically, by interrogating the RFID tag at multiple locations along its path of movement, using multiple antenna pairs, and generating the resulting sum-delta plot the relative angle of positions between the object and the antenna pairs can be determined. In the illustrated example, if the sum-delta outputs from both antenna pairs show a counter-clockwise rotation, then the object can be presumed to be to the left of both antenna pairs. Likewise, if the sum-delta outputs from both antenna pairs show clockwise rotation, then the object can be presumed to the right of both antenna pairs. Finally, if one sum-delta output shows clockwise rotation, and the sum-delta outputs shows counter-clockwise rotation, then the object can be presumed to be between the two antenna pairs. As illustrated in FIG. 3, such a system can be implemented to determine which among a plurality of portals an object is passing through.

In some cases limitations in signal transmission may prevent multiple antenna pairs from receiving backscatter modulated signals. In those cases it may desirable to use an alternative method of determining object location. Specifically, it may be desirable to use one angle of position measurement combined with a distance measurement to determine object location. As was illustrated in FIG. 4, a portal of entry can be determined through the use of an angle measurement combined with a distance measurement.

Several different methods can be used to determine the distance measurement. In one method the phase difference of arrival (PDOA) of backscatter-modulated signals from the RFID tag on the object are used to determine the distance to the object.

PDOA can be used to determine the distance to the object by transmitting a plurality of signals to the RFID tag on the object that is to be located, with the plurality of transmitted signals selected to have different fundamental frequencies. The RFID reader receives and demodulates the plurality of backscatter-modulated signals. The phase in the plurality of backscatter-modulated signals that were received by the RFID reader are determined. From this, a distance calculator determines the rate of change of the phase in the backscatter-modulated signals versus the rate of change in the fundamental frequency of the transmitted signals and uses this information to calculate the distance to the RFID tag.

It should be noted that to have a plurality of signals selected to have different fundamental frequencies there need only be at least one transmitted signal with a fundamental frequency different from at least one other transmitted signal. In general additional signals with additional different fundamental frequencies provides for increased accuracy of the distance calculation. However, it should be noted that nothing prevents the utilization of additional transmitted signals that have the same frequency as other transmitted signals. Phase measurements taken with transmitted signals having the same fundamental frequency as other transmitted signals can be combined with the other phase measurements to generate a more accurate overall calculation of the phase versus frequency rate of the change.

Figure 8:
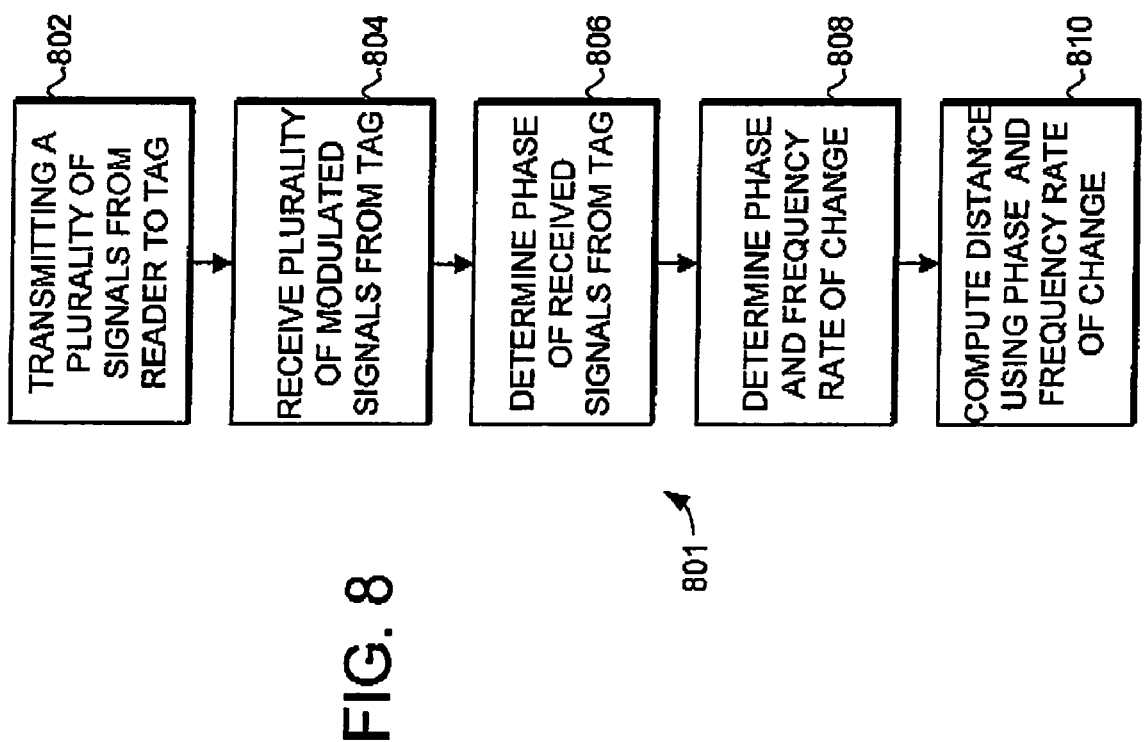
FIG. 8 is a flow diagram of distance determination method in accordance with an exemplary embodiment of the present invention.

Turning now to FIG. 8, a method 801 for determining a distance to an object in accordance with an exemplary embodiment of the present invention is illustrated. The first step 802 is to transmit a plurality of signals from the RFID readers to the tag, with the signals transmitted having a different fundamental frequency. This will typically include addressing the RFID tag. Again, when an RFID tag is addressed, it is put into a responsive mode where it will modulate and backscatter the received signals from the reader. Other tags within range of the reader that are not addressed will typically go into a muted state, where their reflections are intentionally minimized. Thus, the RFID readers are able to select one out of many different tags and receive backscatter-modulated signals only from the selected RFID tag.

To provide a suitable plurality of transmitted signals there needs only be at least one transmitted signal with a fundamental frequency different from at least one other transmitted signal, and additional transmitted signals can have duplicate frequencies. Furthermore, a "fundamental frequency" of a signal, as the term is used in this application, comprises one or more of the primary frequency components in the signal. For example, the fundamental frequency of a signal can be the frequency of the carrier signal without harmonics. It should be noted that the transmitted signal is not necessarily purely sinusoidal and thus may in fact carry harmonics due to the need for pulse shaping at the receivers.

The plurality of transmitted signals are received by the RFID tag. In response to these signals, the selected RFID tag backscatter modulates the plurality of transmitted signals to create a plurality of backscatter-modulated signals. The RFID reader receives and demodulates the plurality of backscatter-modulated signals. Because of the fundamental frequency difference in the originally transmitted signal, each of the plurality of backscatter-modulated signals received back at the reader will have a distinct relative phase.

In step 804, the plurality of modulated signals are received back at the RFID reader. The next step 806 is to determine the phase for the plurality of modulated signals. The phase of the received signals can be determined in a variety of ways, such as channel demodulation. Such a method will be described in greater detail below.

The next step 808 is to determine the rate of change of the phase with respect to the rate of change of the fundamental frequency. The rate of change of the phase with respect to the rate of change of the fundamental frequency can be calculated from the plurality of phase measurements and plurality of transmitted signal fundamental frequencies using a variety of different techniques. For example, in one application, the rate of change of phase with respect to fundamental frequency is determined by performing a linear trend fit of phase measurements and corresponding fundamental frequency values. The linear trend fit is then used to generate a more accurate rate of change or "estimated slope" of phase and frequency.

It should be noted that in some applications steps 802–808 would be repeatedly continued with more transmissions and phase measurements until the rate of the change could be calculated within a specified level of accuracy. For example, the steps 802–808 can be continued until the linear trend fit generates an estimated slope that is within a desired confidence level, where the confidence level can be calculated using any suitable technique such as "goodness of fit" or any other method of assessing the variance of the data trend from a straight line.

The next step 810 is to determine the distance between the RFID reader and the RFID tag using the rate of change of the phase of the received signal with respect to the rate of change of the fundamental frequency of the transmitted signal. As will be explained in greater detail later, the distance (D) between the RFID reader and the RFID tag can be calculated as:

$$D = \frac{\Delta \phi}{\Delta f} \frac{c}{4\pi} \quad (1.)$$

Where $\Delta\phi$ is the change in phase of the backscatter-modulated signals, $\Delta f$ is the change in fundamental frequency of the transmitted signals, and c is the speed of light in meters per second or feet per second depending on the desirable units of the distance measurement. Thus, the distance can be calculated using the rate of change in the phase ($\Delta\phi$) of the backscatter-modulated signals versus the rate of change in the fundamental frequency ($\Delta f$) of the transmitted signals.

As discussed above, the RFID reader transmits a plurality of signals to the RFID tag on the object that is to be located, with the signals selected to have different fundamental frequencies. Again, to implement signals with a plurality of different frequencies only at least one transmitted signal with a fundamental frequency different from at least one other transmitted signal is needed. Furthermore, it should be noted that that nothing prevents the utilization of additional transmitted signals that have the same frequency as other transmitted signals. In general however, transmitting more signals with new frequencies will be desirable to improve the accuracy of the system.

Several methods can be used to determine the phase difference of the received backscatter modulated signals. In general, the received backscatter modulated signals are first demodulated. For example, quadrature demodulators can be used. Quadrature demodulators demodulate the received signal into separately demodulated "I" and "Q" channels. The I and Q channels can then be used to determine the relative phase of the received backscattered signal. In such a system the demodulator preferably uses the same signal generated by the phase-lock-loop oscillator that was used for carrier generation of the originally transmitted signal. As such, the phase of this signal can serve as a reference by which the phase change of the received signals can be measured. Specifically, by determining the phase for multiple received signals with respect to the carrier signal, the relative change in phase between those received signals can be calculated. Thus, determining the phase difference of the received backscatter-modulated signal compared to the originally transmitted signals provides a mechanism for determining the rate of change in the phase of the plurality of backscatter-modulated signals.

One method for determining the phase of the received signals is to measure the AC amplitude of both I and Q channels and use those measurements to determine the phase angle. That is, the peak-to-peak AC amplitude of the I and Q channel can be averaged over some predetermined time period. The relative phase Φ of the received signal as compared to the carrier phase can be determined as:

$$\Phi = \arctan \frac{Q_{amp}}{I_{amp}} \qquad (2.)$$

Where $Q_{AMP}$ is the average AC amplitude in the Q channel and $I_{AMP}$ is the average AC amplitude in the I channel. With the relative phase Φ of multiple backscatter-modulated signals calculated, the phase change between those signals can be calculated and used with the corresponding fundamental frequencies of the transmitted signals to determine the distance to the tag.

It should be noted that methods and systems described above for measuring the phase angle of signals cannot always completely disambiguate the phase of a received signals. Specifically, using the arctangent of the amplitudes will always generate a result of between 0 and 2π radians, when in fact the actual phase can be much greater than 2π. In general, the original measured phase values are referred to as "wrapped", and the process of determining the actual, nominal phase values from the wrapped values is called "phase unwrapping".

Thus, phase unwrapping is a technique that can be used to determine the nominal phase change over a linear span of corresponding fundamental frequencies. One method of phase unwrapping is to linearize the phase shift from the wrapped values. Specifically, the phase unwrapping is accomplished by adding or subtracting multiples of 2π until the phase measurement in question shows a consistent trend over a frequency span.

As one example of unwrapping, when a set of monotonically increasing fundamental frequencies are used, a monotonic set of phase measurements should result after accounting for any noise. For particular phase measurements that do not follow the monotonic trend, they can be unwrapped by adding or subtracting multiples of 2π until they show a linear trend over a linear frequency span. A variety of different phase unwrapping algorithms are available that can be adapted for this use, such as signal processing tools available in MATLAB.

Turning now to FIG. 9, a table 800 illustrates an exemplary data set from which the distance to an RFID tag can be determined using an exemplary embodiment of the present invention. Specifically, the table 800 lists 14 transmitted signal fundamental frequencies and a corresponding 14 measured relative phase measurements. It should first be noted that this is just one example data set, and that typical data sets could include more or less data points. It should also be noted that while example data set shows equal distances between fundamental frequencies, that this will not be the case in many applications.

In the example of table 800, the frequency order of the transmitted signals was randomly selected. Again, when random frequency hopping is used the system operates as spread spectrum system and can transmit with increased power under current regulations. Again, this is just one example, and in other cases different frequency hopping procedures can be used.

The phase measurements illustrated in table 800 are wrapped, again meaning that the phase measurements are limited to values between zero and 2π radians. These values thus do not represent the actual relative phase values, and to accurately calculate the distance it is desirable to unwrap the phase measurements. Turning now to FIG. 10, a table 900 lists the 14 transmitted signal fundamental frequencies in order of fundamental frequency and a corresponding unwrapped 14 measured relative phases. These unwrapped phase values correspond to the actual relative phase of the received backscatter-modulated signals. Again, these unwrapped phase values can be determined by a variety of phase unwrapping techniques, such as adding multiples of 2π until a consistent linear phase trend is recovered.

Figure 11:
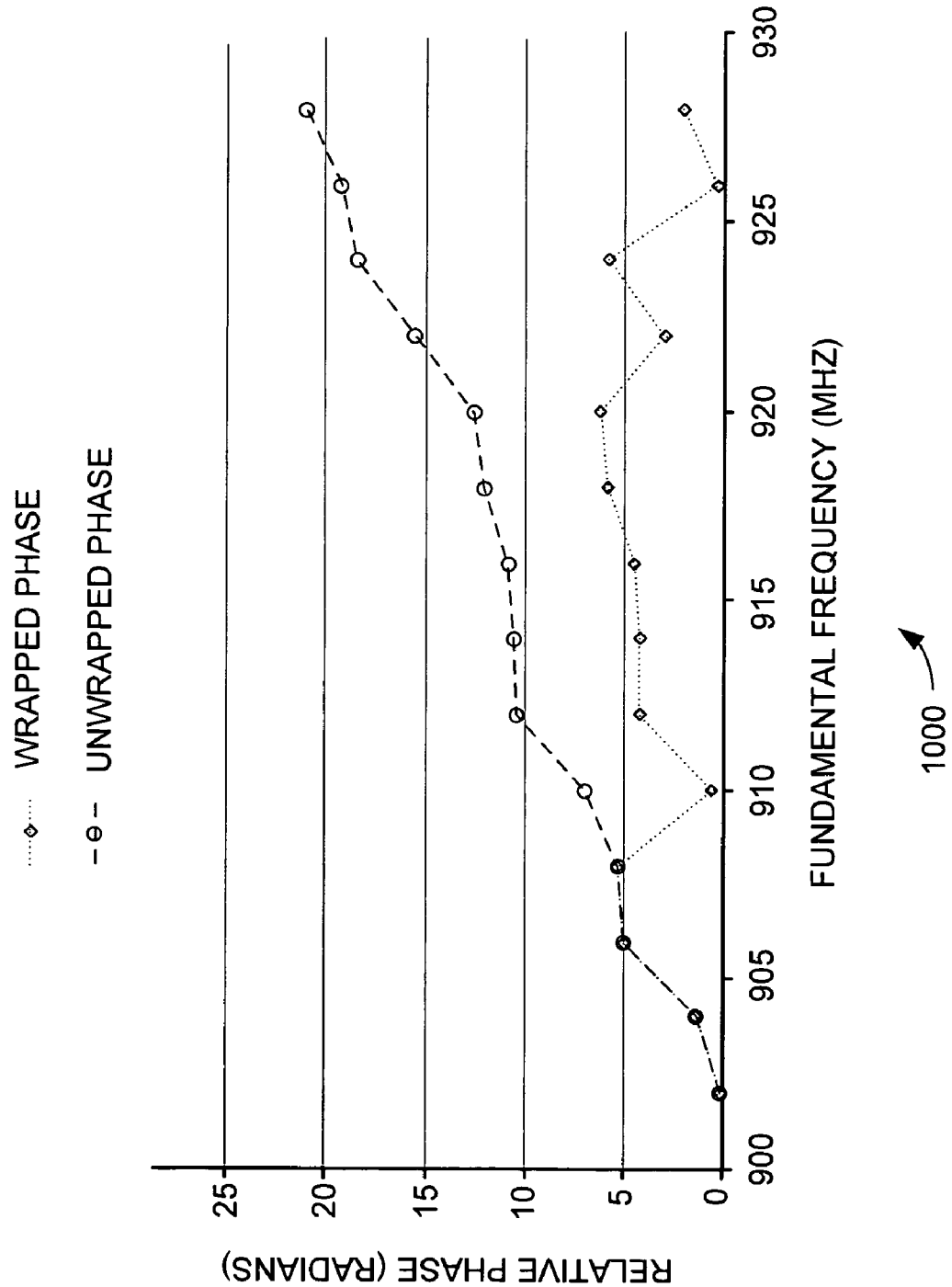
FIGS. 11 and 12 are graph views of an exemplary data set in accordance with an exemplary embodiment of the present invention.

Turning now to FIG. 11, a graph 1000 illustrates the wrapped phase measurements and the unwrapped phase measurements of tables 800 and 900. As can be seen, the unwrapping of phase measurements results in phase measurements that follow a consistent trend. Using phase unwrapping techniques, the underlying phase can be determined even in the presence of significant noise and multi-reflections.

Figure 12:
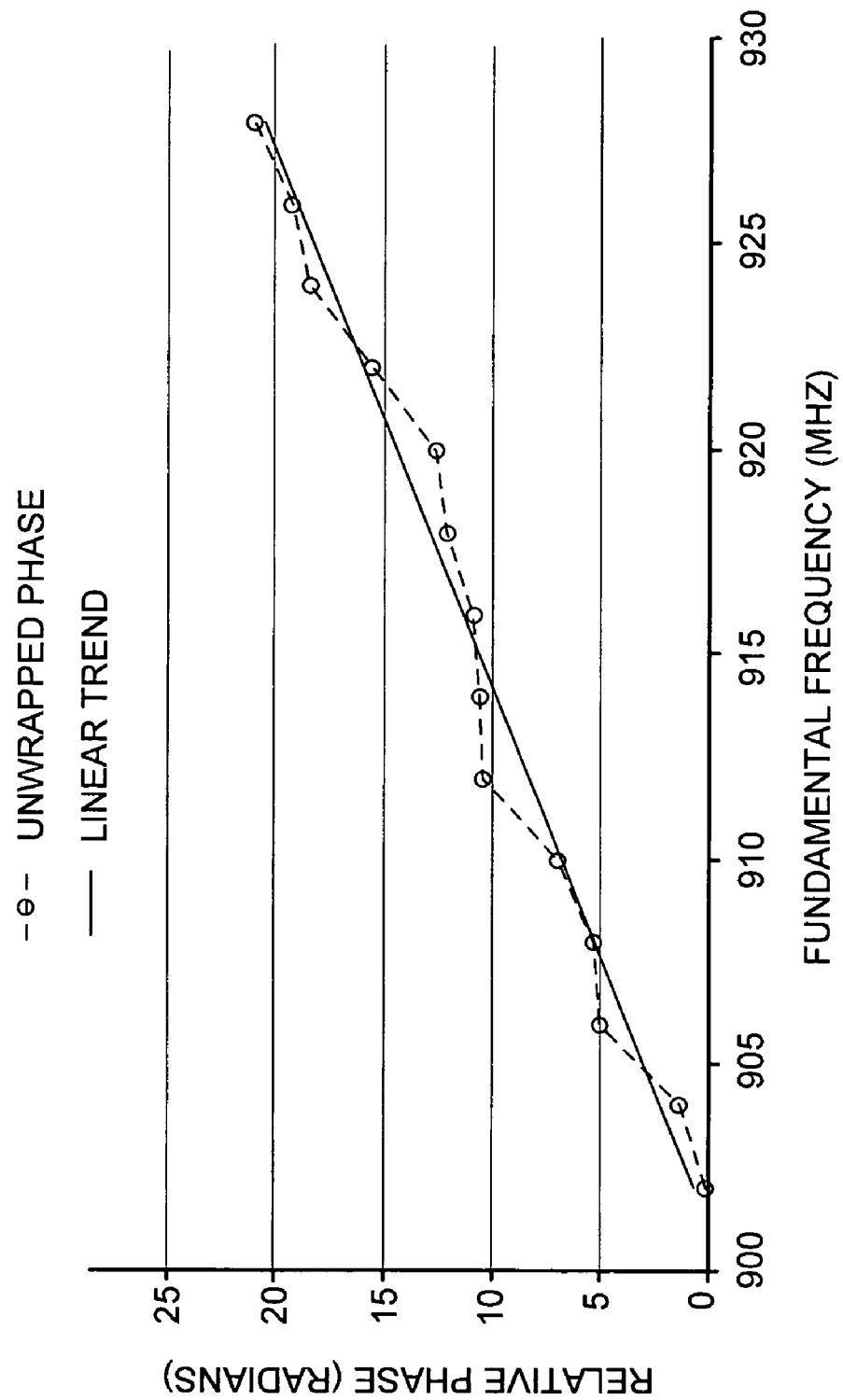

With the unwrapped phase measurements determined, the distance can be determined by calculating the rate of change of the phase with respect to the rate of change of the fundamental frequency. As one example, a linear trend fit of the unwrapped phase measurements the fundamental frequencies can be performed to determine the rate of change. Turning now to FIG. 12, a graph 1100 illustrates the unwrapped phase measurements of table 900 and graph 1000 along with an exemplary linear trend calculated from the phase measurements. The linear trend can be calculated from the data using a variety of techniques such as least squares fit. When calculated the linear trend gives a more accurate calculation of the phase change with respect to the frequency change in the form of the slope of the trend fit line. In the illustrated example, the slope of the linear trend is 9.01E-07 radians/hertz. When calculated, the slope of the linear trend fit line can be used as $\Delta\phi/\Delta f$ in equation (1) to calculate the distance. In this example, using the slope of the linear trend fit line in equation (1) gives a distance measurement of 21.4 meters. Thus, the linear fit method is able to overcome noise in the data such as noise created by multi-path reflections, interference and non-coherent transmissions. Again, this is just one specific example of how a linear trend fit can be used to determine the rate of change of the phase and frequency to calculate the distance to an object with an RFID tag.

More information on PDOA can be found in the patent application entitled "Object Location System and Method Using RFID" by Raj Bridgelall et al, filed on Mar. 1 2004, Ser. No. 10/791,329 and assigned to Symbol Technologies, Inc.

Thus, the present invention provides an object location system and method for locating objects. The system includes an RFID reader, an angle calculator, and a distance calculator to determine which of a plurality of zones an object is located in or passing through. An RFID tag is affixed with the object that is to be located. The RFID reader transmits signals to the RFID tag and receives backscatter-modulated signals from the RFID tag at one or more RFID antennas. From those received signals, the angle calculator determines an angle of position of the RFID tag relative to the RFID antenna. From the angle of position the zone in which the object is located is determined. In one embodiment, a plurality of RFID antennas are distributed over an area. In this embodiment, each of the multiple RFID antennas receives a backscatter-modulated signal from the RFID tag and the angle of position relative to each RFID antenna is determined. The multiple angles of position at multiple locations are then used to triangulate the position of the object that includes the RFID tag. Thus, the system and method is able to determine a zone in which the object is located. In another embodiment, the system and method further includes a distance calculator. Again, signals from the RFID tag are received by the RFID reader, and these signals are used to determine the distance to object. The distance measurement is then combined with angle of position measurement to again determine the zone in which the object is located.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

The invention claimed is:

1. An object location system for locating an object having an RFID tag, the object location system comprising:
   an RFID reader, the RFID reader transmitting a plurality of transmitted signals to the RFID tag and receiving a plurality of backscatter-modulated signals from the RFID tag; and
   an angle calculator, the angle calculator determining an angle of position of the RFID tag from the backscatter-modulated signals, wherein the angle calculator determines the angle of position of the RFID tag by determining a sum of the backscatter-modulated signals received at two antennas and a difference of the backscatter modulated signals received at the two antennas, and wherein the object location system determines object location using the angle of position of the RFID tag.

2. The system of claim 1 wherein the RFID reader includes a plurality of antenna pairs, the plurality of antenna pairs positioned around a plurality of portals, wherein at least one of the plurality of antenna pairs receives the backscatter-modulated signals and wherein the angle calculator determines the angle of position of the RFID tag relative to the receiving antenna pair to determine which of the plurality of portals an object passes.

3. The system of claim 1 wherein the two antennas are coupled to a 180-degree hybrid.

4. The system of claim 1 wherein the angle calculator determines the angle of position of the RFID tag by determining a sum of the backscatter-modulated signals received at the two antennas and a difference of the backscatter-modulated signals received at the two antennas for backscatter-modulated signals from multiple locations of the object as the object moves in a known direction.

5. The system of claim 1 wherein the object location system further comprises a distance calculator, the distance calculator determining a distance from the RFID tag to the RFID reader based on the backscatter modulated signals, and wherein the object location system determines object location using both the determined distance and the angle of position.

6. The system of claim 5 wherein the distance calculator determines a distance from the RFID tag to the RFID reader by determining a rate of change of the phase in a plurality of backscatter-modulated signals with respect to rate of change in a fundamental frequency of a plurality of transmitted signals.

7. The system of claim 6 wherein the rate of change of the phase in the plurality of backscatter-modulated signals with respect to a rate of change in the fundamental frequency of the plurality of transmitted signals is determined by performing a linear trend fit of the phase in the plurality of backscatter-modulated signals versus the fundamental frequency of the plurality of transmitted signals.

8. An object location system for locating an object having an RFID tag, the object moving along a path, the object location system comprising:
   an RFID transmitter, the RFID transmitter transmitting a plurality of transmitted signals to the RFID tag as the object moves along the path;
   a plurality of RFID antenna pairs, at least one of the plurality of RFID antenna pairs receiving a plurality of backscatter modulated signal from the RFID tag in response to the plurality of transmitted signals as the object moves along multiple locations along the path;
   an angle calculator, the angle calculator determining an angle of position of the RFID tag relative to at least one of the plurality of RFID antenna pairs, wherein the angle calculator determines the angle of position of the RFID tag by determining a vector sum of the backscatter-modulated signal received at the at least one of the plurality of RFID antenna pairs and by determining a vector delta of the backscatter-modulated signal received at the at least one of the plurality of RFID antenna pairs for the plurality of backscatter-modulated signals from the RFID tag at the multiple locations of the object as the object moves along the path.

9. The system of claim 8 wherein each of the RFID antenna pairs comprises a 180 degree hybrid.

10. The system of claim 8 wherein the angle calculator determines the angle of position by determining a rotation direction of the vector sum and vector delta in sum-delta space resulting from the multiple backscatter-modulated signals from the RFID tag at multiple locations of the object as the object moves along the path.

11. The system of claim 10 wherein a rotation in the sum-delta space in a first direction corresponds to an angle of position of less than 90 degrees and wherein a rotation in the sum-delta space in a second direction corresponds to an angle of position of between 180 degrees and 90 degrees.

12. The system of claim 11 wherein the RFID transmitter transmits the plurality of transmitted signals at a rate selected to cause a rotation in the sum-delta space of less than 90 degrees between consecutive transmissions.

13. The system of claim 8 wherein the system is configured to determine which of a plurality of portals the object is passing through.

14. The system of claim 8 further comprising a distance calculator, the distance calculator determining a distance from the RFID tag to the at least one of the plurality of RFID antenna pairs based on a phase difference in the backscatter modulated signals, and wherein the object location system determines object location using both the determined distance and the angle of position of the RFID tag.

15. The system of claim 14 wherein the distance calculator determines a distance from the RFID tag to the RFID reader by determining a rate of change of the phase in a plurality of backscatter-modulated signals with respect to rate of change in a fundamental frequency of a plurality of transmitted signals, and wherein the rate of change of the phase in the plurality of backscatter-modulated signals with respect to a rate of change in the fundamental frequency of the plurality of transmitted signals is determined by performing a linear trend fit of the phase in the plurality of backscatter-modulated signals versus the fundamental frequency of the plurality of transmitted signals.

16. The system of claim 14 wherein the RFID reader continues to transmit additional transmitted signals and receive additional backscatter-modulated signals and wherein the distance calculator continues to determine a phase for each of the additional backscatter-modulated signals received and uses the phase for each additional backscatter-modulated signal to determine the distance from the RFID reader to the RFID tag is until the distance is computed within a specified level of accuracy.

17. A method of locating an object having an RFID tag, the method comprising the steps of:
transmitting a plurality of transmitted signals from an RFID reader to the RFID tag;
receiving a plurality of backscatter-modulated signals from the RFID tag;
determining an angle of position of the RFID tag from the backscatter-modulated signals, wherein the step of determining an angle of position of the RFID tag from the backscatter-modulated signals comprises determining a sum of the backscatter-modulated signals received at two antennas and a difference of the backscatter modulated signals received at the two antennas; and
determining an object location using the angle of position of the RFID tag.

18. The method of claim 17 wherein the step of receiving a plurality of backscatter-modulated signals from the RFID tag comprises receiving at least one pair of antennas in a plurality of pairs of antennas, and wherein the step of determining an angle of position of the RFID tag from the backscatter-modulated signals comprises determining the angle of position of the RFID tag relative to the at least one pair of antennas.

19. The method of claim 17 wherein the determining a sum of the backscatter-modulated signals received at the two antennas and a difference of the backscatter modulated signals received at the two antennas are performed by a 180-degree hybrid.

20. The method of claim 17 wherein the step of determining an angle of position of the RFID tag from the backscatter-modulated signals comprises determining a sum of the backscatter-modulated signals received at the two antennas and a difference of the backscatter-modulated signals received at the two antennas for backscatter-backscatter modulate signals from multiple locations of the object as the object moves is a known direction.

21. The method of claim 17 further comprising the step of determining a distance from the RFID tag to the RFID reader based on the backscatter-modulated signals, and wherein the step of determining an object location using the angle of position of the RFID tag comprises using the determined distance and the angle of position.

22. The method of claim 21 wherein the step of computing a distance to the RFID tag comprises determining a rate of change of phase in the plurality of backscatter-modulated signals with respect to a rate of change in the fundamental frequency of the plurality of transmitted signals.

23. The method of claim 22 wherein the step of computing a distance to the RFID tag by determining a rate of change of phase in the plurality of backscatter-modulated signals with respect to a rate of change in the fundamental frequency comprises performing a linear trend fit of the phase in the plurality of backscatter-modulated signals versus the fundamental frequency of the plurality of transmitted signals.

24. A method of locating an object having an RFID tag moving along a path, the method comprising the steps of:
transmitting a plurality of transmitted signals from an RFID reader to the RFID tag as the object moves along the path;
receiving a plurality of backscatter-modulated signals from the RFID tag at at least one of a plurality of RFID antenna pairs as the object moves along multiple locations along the path;
determining a vector sum of the backscatter-modulated signal received at the at least one of the plurality of RFID antenna pairs and determining a vector delta of the backscatter-modulated signal received at the at least one of the plurality of RFID antenna pairs for the plurality of backscatter-modulated signals from the RFID tag as the object moves along the multiple locations;
determining an angle of position of the RFID tag from the vector sum and vector delta; and
determining an object location using the angle of position of the RFID tag.

25. The method of claim 24 wherein each of the RFID antenna pairs comprises a 180-degree hybrid.

26. The method of claim 24 wherein the step of determining an angle of position of the RFID tag from the vector sum and vector delta comprises determining a rotation direction of the vector sum and vector delta in sum-delta space resulting from the multiple backscatter-modulated signals from the RFID tag at multiple locations of the object as the object moves along the path.

27. The method of claim 26 wherein a rotation in the sum-delta space in a first direction corresponds to an angle of position of less than 90 degrees and wherein a rotation in the sum-delta space in a second direction corresponds to an angle of position of between 180 degrees and 90 degrees.

28. The method of claim 27 wherein the step of transmitting a plurality of transmitted signals from an RFID reader to the RFID tag as the object moves along the path comprises transmitting signals at a rate selected to cause a rotation in the sum-delta space of less than 90 degrees between consecutive transmissions.

29. The method of claim 24 wherein the step of determining an object location using the angle of position of the RFID tag comprises determining which of a plurality of portals the object is passing through.

30. The method of claim 24 further comprising the step of determining a distance from the RFID tag to the RFID reader based on the backscatter-modulated signals, and wherein the step of determining an object location using the angle of position of the RFID tag comprises using the determined distance and the angle of position.

31. The method of claim 30 wherein the step of computing a distance to the RFID tag comprises determining a rate of change of phase in the plurality of backscatter-modulated signals with respect to a rate of change in the fundamental frequency of the plurality of transmitted signals by performing a linear trend fit of the phase in the plurality of backscatter-modulated signals versus the fundamental frequency of the plurality of transmitted signals.

32. The method of claim 31 wherein the step of computing a distance to the RFID tag by determining a rate of change of phase in the plurality of backscatter-modulated signals with respect to a rate of change in the fundamental frequency comprises continuing to continues to transmit additional transmitted signals and receive additional backscatter-modulated signals until the distance is computed within a specified level of accuracy.

* * * * *

UNITED STATES PATENT AND TRADEMARK OFFICE
CERTIFICATE OF CORRECTION

| | | |
|---|---|---|
| PATENT NO. | : 7,170,412 B2 | Page 1 of 1 |
| APPLICATION NO. | : 10/931476 | |
| DATED | : January 30, 2007 | |
| INVENTOR(S) | : Knox et al. | |

It is certified that error appears in the above-identified patent and that said Letters Patent is hereby corrected as shown below:

In Claim 16, column 17, line 20, delete the word "is" between the words "tag" and "until".

In Claim 20, column 17, lines 56-57, delete the words "backscatter-backscatter" and insert the word --backscatter--.

In Claim 20, column 17, line 56, delete the word "is" and insert the word --in--.

In Claim 32, column 20, line 1, delete the words "continues to".

Signed and Sealed this

Nineteenth Day of June, 2007

JON W. DUDAS
*Director of the United States Patent and Trademark Office*